Nov. 27, 1956   D. H. SHAPIRO   2,771,826
ADJUSTABLE CAMERA-SUPPORT
Filed Jan. 20, 1955

INVENTOR.
DAVID H. SHAPIRO
BY
ATTORNEY.

United States Patent Office 2,771,826
Patented Nov. 27, 1956

2,771,826

ADJUSTABLE CAMERA-SUPPORT

David H. Shapiro, Forest Hills, N. Y.

Application January 20, 1955, Serial No. 483,021

3 Claims. (Cl. 95—86)

This invention relates to supporting devices for cameras and more particularly is an adjustable support for a camera attachable to the person of the user.

It is an object of the present invention to provide an adjustable support for a camera which may be carried by the belt and top of the trousers of the photographer and held captive by a strap around his neck.

It is a further object of the present invention to provide a support for a camera which is held firmly by the belt and top of the trousers of the photographer, which is adjustable to bring the eyepiece in alignment with an eye of the photographer and which is retained in position by a neck strap or band to thus permit the arms of the photographer to be free to operate the camera, at slow exposure.

It is another object of the present invention to adjustably support the camera from the belt and top of the trousers of a photographer so that the hands of the photographer are free to manipulate the shutter and adjust the focus of the camera, and also to take light meter readings.

It is yet another object of the present invention to provide efficient, practical, economical and simple camera-supporting means which will enable the camera to be carried by the body of the photographer and positioned in alignment with the photographer's eye to bring the camera into focus.

A still further object of the present invention is to provide a device by which a camera may be wholly supported by the body of a photographer and thus eliminate the use of or act as a substitution for the conventional tripod. It permits the camera to be easily adjusted and focused and held steadily from the body during photographing. The invention provides an adjustable camera-support particularly adapted for use by the amateur photographer who desires freedom of action of his hands while climbing or walking in places where it would be very inconvenient to set up a tripod, particularly in regions having heavy snowfalls.

These and other objects and advantages of the invention will appear as the description proceeds, it being understood, however, that it is not intended that the invention be limited to the exact details described herein which illustrate the production of a satisfactory example of many which may be obtained as a result of the knowledge gained through or gleaned from an understanding of the invention; and it is further intended that there be included as part of the invention all such obvious changes and modifications thereof as would occur to a person skilled in the art to which this invention pertains and as would fall within the scope of the following claims.

Figure 1:
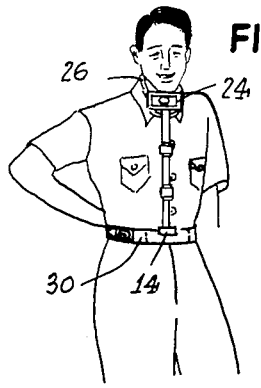
Figs. 1 and 1A illustrate two different positions of the device according to the invention, the same being supported on the belt and top of the trousers and by a strap around the neck of a photographer.

Referring now more particularly to the drawing, the camera-support is generally indicated by the numeral 10. Its base 11 comprises an arcuate plate 12 preferably provided at its end portions, with friction means such as the corrugated rubber elements 13, a preferably shorter arcuate plate 14 preferably provided at its end portions with friction means such as the corrugated rubber elements 15 and connected in spaced relation to plate 12 by means of a top bridge 16.

Bridge member 16 has a central threaded opening 17 threadedly engaged by the threaded pin 18 secured to the rod or cylindrical member 19 of the adjustable standard. Member 19 is telescopically slidable in a hollow rod or cylindrical member 20, and again member 20 is telescopically slidable in a hollow rod or cylindrical member 21. The lower end of member 20 is threaded and engages the threads of a tightening bushing or sleeve 22 and the lower end of member 21 is likewise threaded and threadedly engages a tightening bushing or sleeve 23, so that the members 20 and 21 may be extended to any position of height within their limitations and fixed in such position by turning the respective bushings until tightened.

The uper end of member 21 is provided with a preferably metal ferrule 22 fitted over said end and which is provided with a threaded pin 23' for screw engagement with a corresponding conventional threaded opening in the camera 24 or tilting camera-support (not shown). Ferrule 22 is provided with a lateral through slot 25 through which is threaded a neck supporting strap 26 which is adjustable about the neck of the wearer.

Figure 1A:
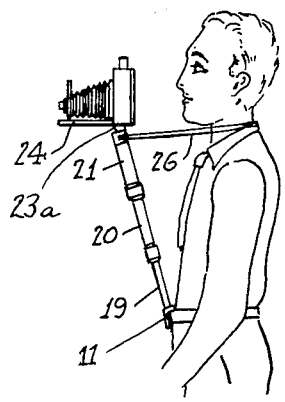
Figure 5:
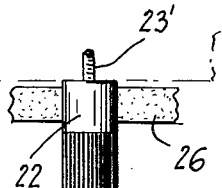
Fig. 5 is a sectional view taken on line 5—5 of Fig. 2.
Figure 5:
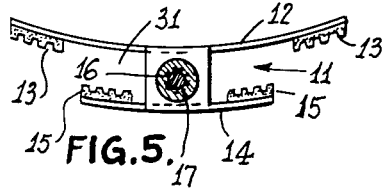
Figure 2:
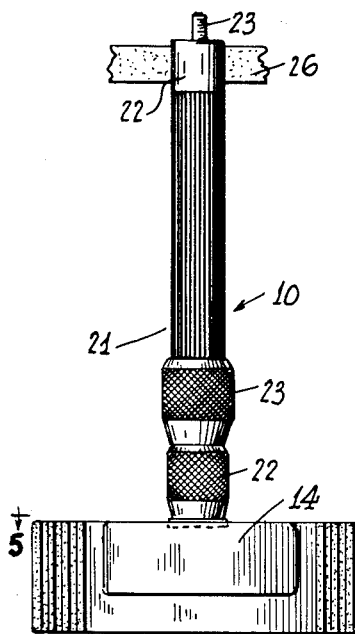
Fig. 2 is a front view of the camera-support in telescoped condition.
Figure 3:
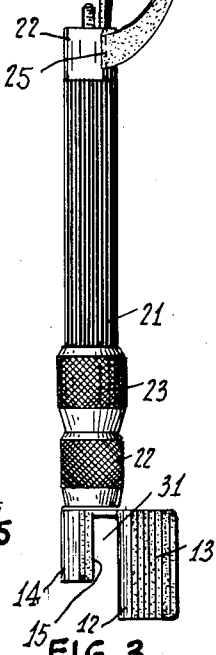
Fig. 3 is a side view thereof showing a little more of the neck strap.
Figure 4:
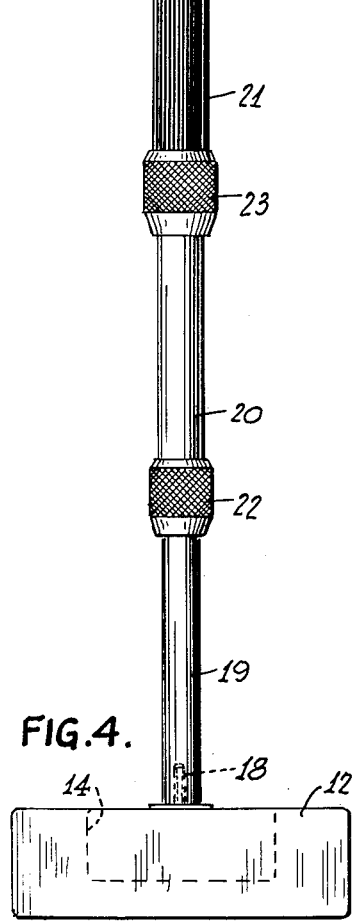
Fig. 4 is a rear view of the camera-support in extended condition.

As illustrated in Figs. 1 and 1A, strap 26 is looped over the head of the photographer and the base 11 of the camera-support is supported on the belt 30 and top of the trousers of the photographer with the arcuate plate 12 against the abdomen of the photographer and the front portion of the belt 30 and top of the trousers received in the space 31 between the arcuate plates 12 and 14. The camera 24 may be then raised to any desired position by telescopic adjustment of the members 20, 21. The camera can thus be brought into any position for operation of the camera, such as, for example, a position level with the eyes of the photographer, when the object to be photographed may be easily focused or sighted through the view-finder. The conventional ball joint or swivel 23a permits swinging of the camera relative to support 10.

From the foregoing it is evident that there has been provided by this invention a very practical, simple and efficient adjustable camera-support utilizing the belt and the top of the trousers of the photographer as a base to steadily hold the support in position, and being facilitated by the use of a bridle.

Although the drawing and the above specification disclose the best mode in which I have contemplated embodying my invention, I desire in no way to be limited to details of such disclosure, for in the further practical application of my invention many changes in the form and proportion may be made as circumstances require or experience suggests without departing from the spirit of the invention within the scope of the appended claims. Having thus described my invention what I claim as new and desire to secure by Letters Patent is:

1. A camera support comprising two elongated plates in side-by-side relation and spaced apart with a bridge extending therebetween and joining the plates together at one of their adjacent longitudinal edges and midway between the ends thereof, the spaces between said plates at their opposite edge being open to receive therebetween a portion of a body encircling member, at least one of said elongated plates including corrugated friction material on the inner face thereof to engage the body encircling member and hold the camera support relative thereto, support means on the bridge, and a telescopic camera-support connected at one end with said support means and extending upwardly therefrom, on the other end of which a camera is mounted for supporting the camera on the body encircling member.

2. A camera support according to claim 1, wherein the members are curved longitudinally, and one of said members is shorter than the other.

3. A camera support comprising two elongated plates in side-by-side relation and spaced apart with a bridge extending therebetween and joining the plates together at one of their adjacent longitudinal edges and midway between the ends thereof, the spaces between said plates at their opposite edge being open to receive therebetween a portion of a body encircling member, at least one of said elongated plates having corrugated friction material on the inner face thereof toward the other of said plates for engagement with the body encircling member to hold the camera support in position relative thereto, a pin anchored at one end to the bridge and upstanding therefrom, and an upright standard telescoped at one end over the pin and extending upwardly therefrom, on the other end of which a camera is adapted to be mounted for supporting the camera on the body encircling member.

References Cited in the file of this patent

UNITED STATES PATENTS

| 817,207 | Wheeler | Apr. 10, 1906 |
| 2,602,978 | Clark | July 15, 1952 |
| 2,655,338 | Stoger | Oct. 13, 1953 |
| 2,658,435 | Sarvoy | Nov. 10, 1953 |

FOREIGN PATENTS

| 336,133 | Great Britain | Oct. 9, 1930 |